United States Patent
Dahl

(10) Patent No.: US 8,316,127 B2
(45) Date of Patent: Nov. 20, 2012

(54) DETERMINING DURATION OF USER INTERACTION

(75) Inventor: Stephan Dahl, Speyer (DE)

(73) Assignee: SAP AG, Walldorf (DE)

( * ) Notice: Subject to any disclaimer, the term of this patent is extended or adjusted under 35 U.S.C. 154(b) by 302 days.

(21) Appl. No.: 12/626,301

(22) Filed: Nov. 25, 2009

(65) Prior Publication Data

US 2011/0125832 A1    May 26, 2011

(51) Int. Cl.
*G06F 15/173* (2006.01)
*G06F 15/16* (2006.01)
(52) U.S. Cl. .................. 709/224; 709/203; 709/223
(58) Field of Classification Search .......... 709/203, 709/224
See application file for complete search history.

(56) References Cited

U.S. PATENT DOCUMENTS

| | | | |
|---|---|---|---|
| 6,321,263 B1 * | 11/2001 | Luzzi et al. ............ | 709/224 |
| 7,685,270 B1 * | 3/2010 | Vermeulen et al. ........ | 709/224 |
| 2003/0221000 A1 * | 11/2003 | Cherkasova et al. ....... | 709/224 |
| 2006/0221851 A1 * | 10/2006 | Klein et al. ............. | 370/252 |

OTHER PUBLICATIONS

S. Roy, "Measuring Web application response time: Meet the client," JavaWorld.com, Nov. 18, 2008, 13 pages.
HttpWatch: Overview [retrieved May 25, 2010] http://www.httpwatch.com.

* cited by examiner

*Primary Examiner* — Wing Chan
*Assistant Examiner* — David X Yi
(74) *Attorney, Agent, or Firm* — Fish & Richardson P.C.

(57) ABSTRACT

In some implementations, methods for determining a duration of user interaction include monitoring communication between a client computer and a server, identifying a message time period, during which messages are communicated between the client computer and the server, and monitoring activity of a processor of the client computer. A first time period of processor activity is identified, the first time period including a first start time and a first end time, the first end time being within the message time period. A second time period of processor activity is identified, the second time period including a second start time and a second end time, the second start time being within the message time period. The duration of user interaction is determined based on the first start time and the second end time.

18 Claims, 6 Drawing Sheets

DETERMINING DURATION OF USER INTERACTION

BACKGROUND

Software applications can be developed to meet a number of software requirements. In general, a requirement is a singular documented need of what a particular product or service should provide or perform. Software requirements may identify a necessary attribute, capability or characteristic of a system in order for the system to have value and utility to a user. In particular, software requirements may include functional requirements, non-functional requirements, and/or constraint requirements. Software requirements are typically used by developers to implement useful and helpful software applications or services for a subset of users.

Developing requirements can be divided into a number of phases, including requirements elicitation (e.g., gathering the requirements from stakeholders), analysis (e.g., checking for consistency and completeness), specification (e.g., documenting the requirements), and validation (e.g., making sure the specified requirements are correct). The data gathered to create requirements or the requirements themselves may be used as inputs into the design of new products and/or services. Accordingly, developers can implement products and services that meet or exceed particular requirements criteria.

SUMMARY

Implementations of the present disclosure provide methods for determining a duration of user interaction. In some implementations, a method includes monitoring communication between a client computer and a server, identifying a message time period, during which messages are communicated between the client computer and the server, and monitoring activity of a processor of the client computer. A first time period of processor activity is identified, the first time period including a first start time and a first end time, the first end time being within the message time period. A second time period of processor activity is identified, the second time period including a second start time and a second end time, the second start time being within the message time period. The duration of user interaction is determined based on the first start time and the second end time.

In some implementations, the method further includes monitoring a plurality of timestamps associated with the messages, and identifying the message time period based on the plurality of timestamps.

In some implementations, the method further includes providing a proxy between the client computer and the server, the messages passing through the proxy.

In some implementations, the method further includes comparing the duration of user interaction to a predetermined threshold duration, and generating an alert when the duration of user interaction exceeds the predetermined threshold duration.

In some implementations, the messages comprise hypertext transfer protocol (HTTP) messages.

In some implementations, the duration of user interaction is determined as a difference between the first start time and the second end time.

In some implementations, the client computer executes a particular web client from a plurality of available web clients, and the duration is determined independently of the particular web client.

Implementations of the present disclosure further provide a computer-readable storage medium coupled to one or more processors and having instructions stored thereon which, when executed by the one or more processors, cause the one or more processors to perform operations in accordance with implementations of the methods provided herein.

Implementations of the present disclosure also provide a system including a client computer, a server in communication with the client computer, and one or more processors operable to execute instructions to perform operations in accordance with implementations of the methods provided herein.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
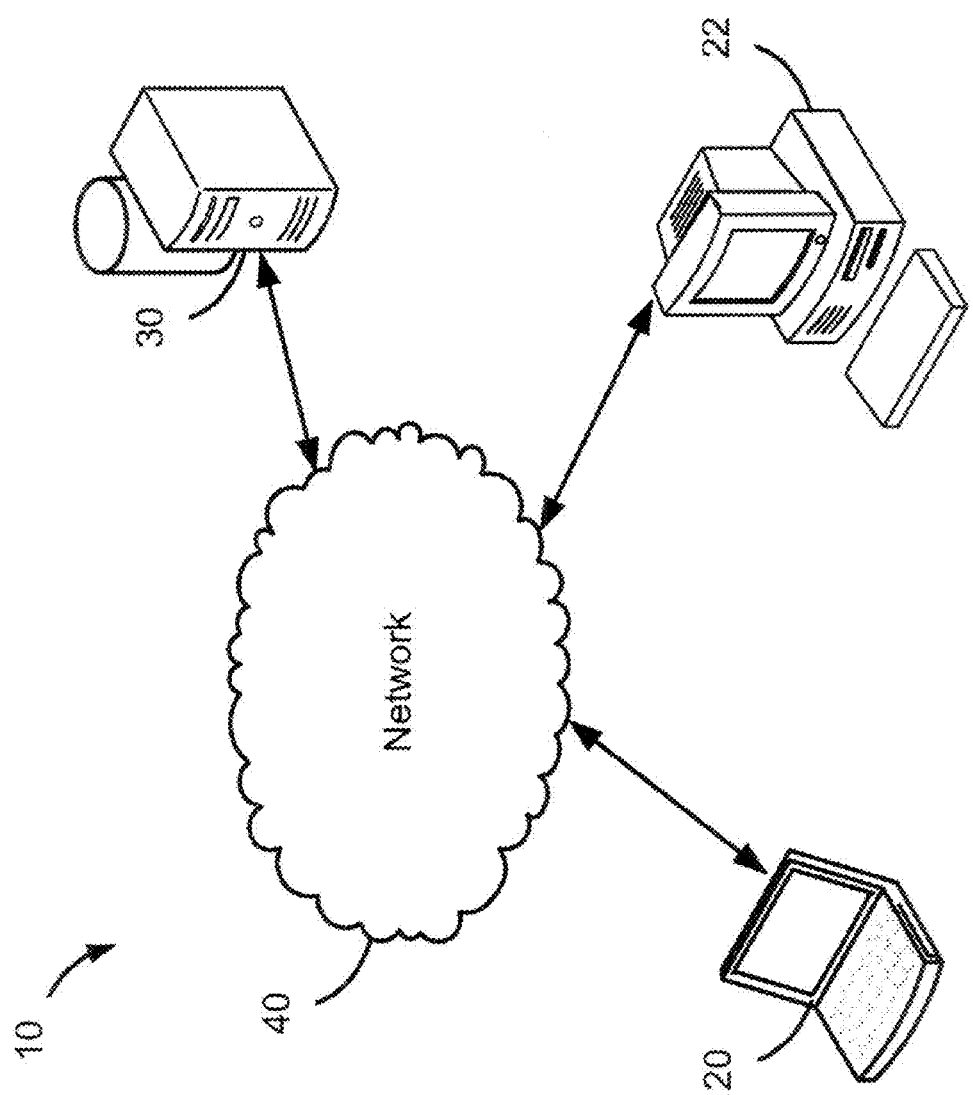
FIG. 1 is a schematic illustration of an exemplar network in accordance with implementations of the present disclosure.

FIG. 1 is a schematic illustration of a network architecture 10 that can be used to execute implementations of the present disclosure. The architecture 10 may represent any client/server system that spans one or more networks. The architecture 10 can, for example, evaluate performance of an application or service on a web client. Evaluating the performance of a product or service may include, but is not limited to monitoring and measuring user interactions, application processing time, and resource consumption (e.g., memory usage, CPU usage, network bandwidth, etc.). In one example, the architecture 10 can employ structure to determine a duration of user interaction in a web based application. In particular, the architecture 10 can measure the activity of a processor on a client device by determining a difference between a start time and an end time of the user interaction in an application. In some implementations, the architecture 10 can measure the duration of multiple user interactions over a particular time period. The measurements collected using architecture 10 can, for example, be used to improve processing efficiency and/or performance speed of one or more applications.

Measuring the activity of a processor on a client device may include measuring response patterns. For example, the architecture 10 can measure an elapsed time for a response to be rendered in a browser after a user clicks on, or otherwise selects an item in an application. Scheduled sampling and activity measuring of processor activities can be employed to assess whether an application is functioning within system guidelines. For example, analyzing activity measurements can be used to ensure an application quickly responds to a user's request without allowing additional time that may confuse, distract, or otherwise dissuade the user from using the application. That is, measuring the activity of a processor can provide a usability test that ensures the user does not deem the accessed application as slow or lacking in some manner.

At a high level, the architecture 10 may represent a client/server system supporting multiple computer systems including a client 20, a client 22, and/or one or more servers 30 that are connectively coupled for communication with one another over a network 40. In some implementations, the clients 20, 22 may be directly connected to the server 30 (without connecting via network 40) to monitor user interactions. For example, the client 20 may employ an HTTP proxy to communicate with the server 30. The HTTP proxy acts as an intermediary for requests from clients seeking resources from other servers.

The clients 20, 22 are intended to represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

The server 30 is intended to represent various forms of servers including, but not limited to a web server, an application server, a proxy server, a network server, a server farm, etc. The server 30 can, for example, monitor communications between the client 20 and itself to determine the duration of a user interaction. The communication monitoring may include server 30 determining the duration of user interactions by analyzing one or more messages sent between the client 20 and the server 30. For example, the architecture 10 can determine the duration time of one or more user interactions in a number of applications executed on the web client 20 or the web client 22, for example, using the server 30. In some implementations, the server 30 runs an application that a user interacts with via a client. The client interacting with the server can determine a begin time and an end time of each interaction. The measurement of the processor activities and the timestamps of the communication can occur on the same client to ensure consistency in the timestamps, and obviate any issues based on unknown delays in the network and the unknown clock difference between client and server.

In operation, multiple clients (e.g., clients 20, 22) can communicate with server 30 via network 40. In order to run an application, such as a browser-based application, for example, each client (e.g., clients 20, 22) can establish a corresponding session with the server 30. Each session can involve two-way information exchange between the server 30 and each individual client 20, 22, or other clients not depicted in FIG. 1. In some implementations, a user can invoke applications available from the server 30 in a web browser running on client 20, 22. For example, each application on each client can establish a unique HTTP session with the server 30. Each application can individually access data from a number of database resources. The network 40 can be provided as a large computer network, such as a local area network (LAN), wide area network (WAN), the Internet, a cellular network, or a combination thereof connecting any number of mobile clients 20 and servers 30.

In some implementations, the client devices 20, 22 may communicate wirelessly through a communication interface (not shown), which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver (not shown). In addition, short-range communication may occur, such as using a Bluetooth, WiFi, or other such transceiver.

In some implementations, the architecture 10 can be a distributed client/server system that spans one or more networks such as network 40. In some implementations, the network 40 can include the Internet, a wireless service network and may include the Public Switched Telephone Network (PSTN). In other implementations, the network 40 may include a corporate network (e.g., an intranet) and one or more wireless access points.

Figure 2:
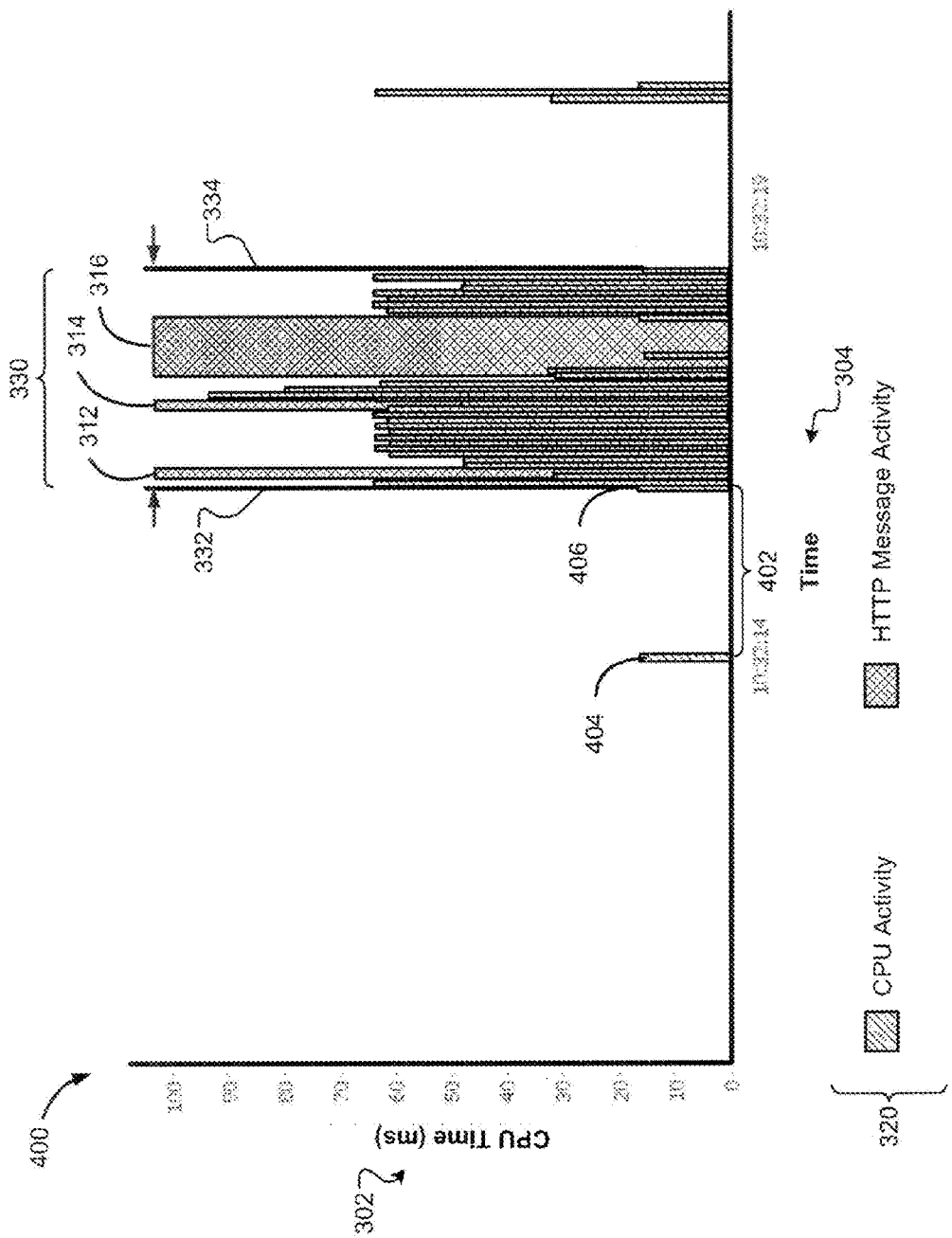
FIG. 2 is a graphical representation of exemplar processor and message activity on a web client.
Figure 3:
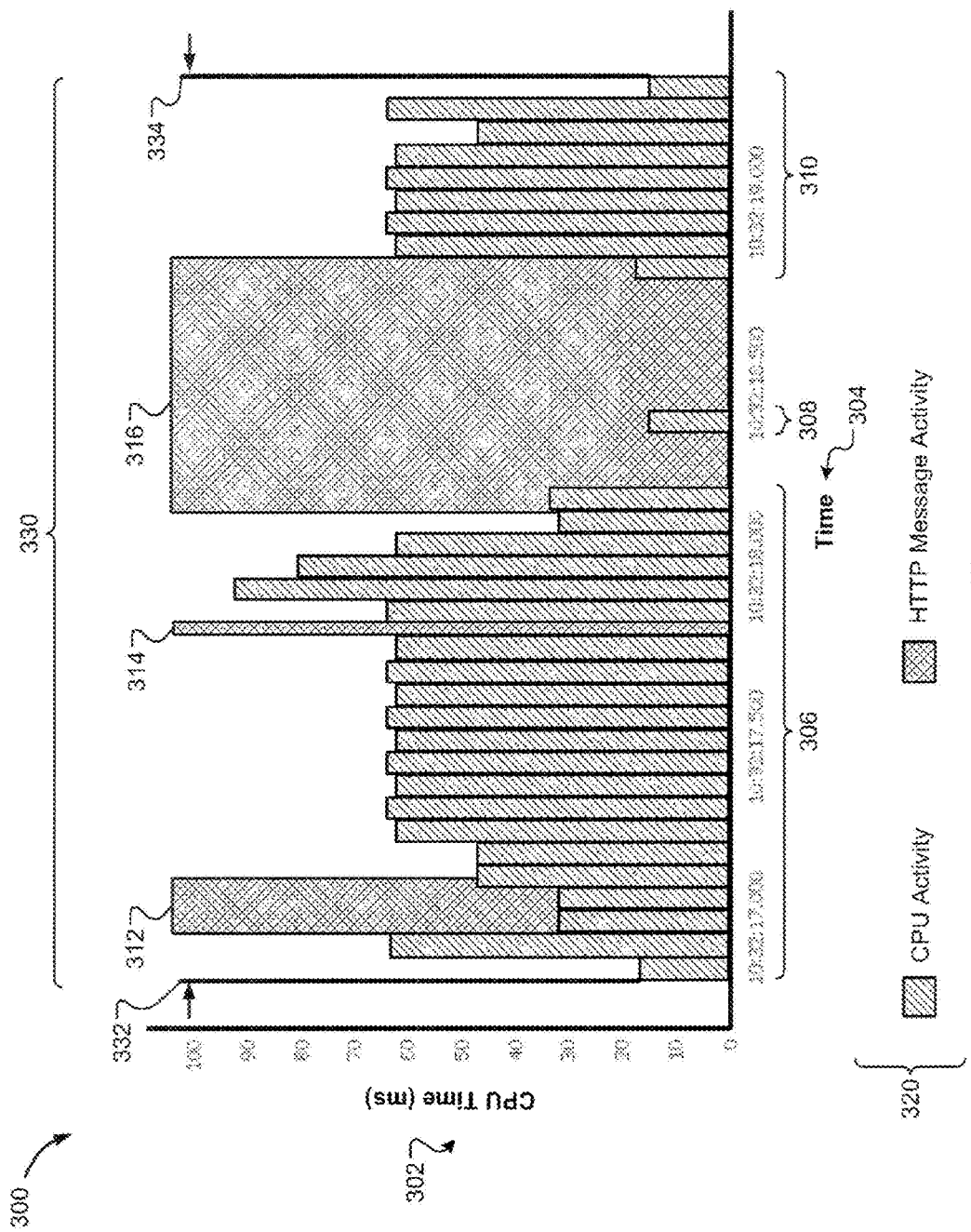
FIG. 3 is another graphical representation of processor and message activity on a web client.
Figure 4:
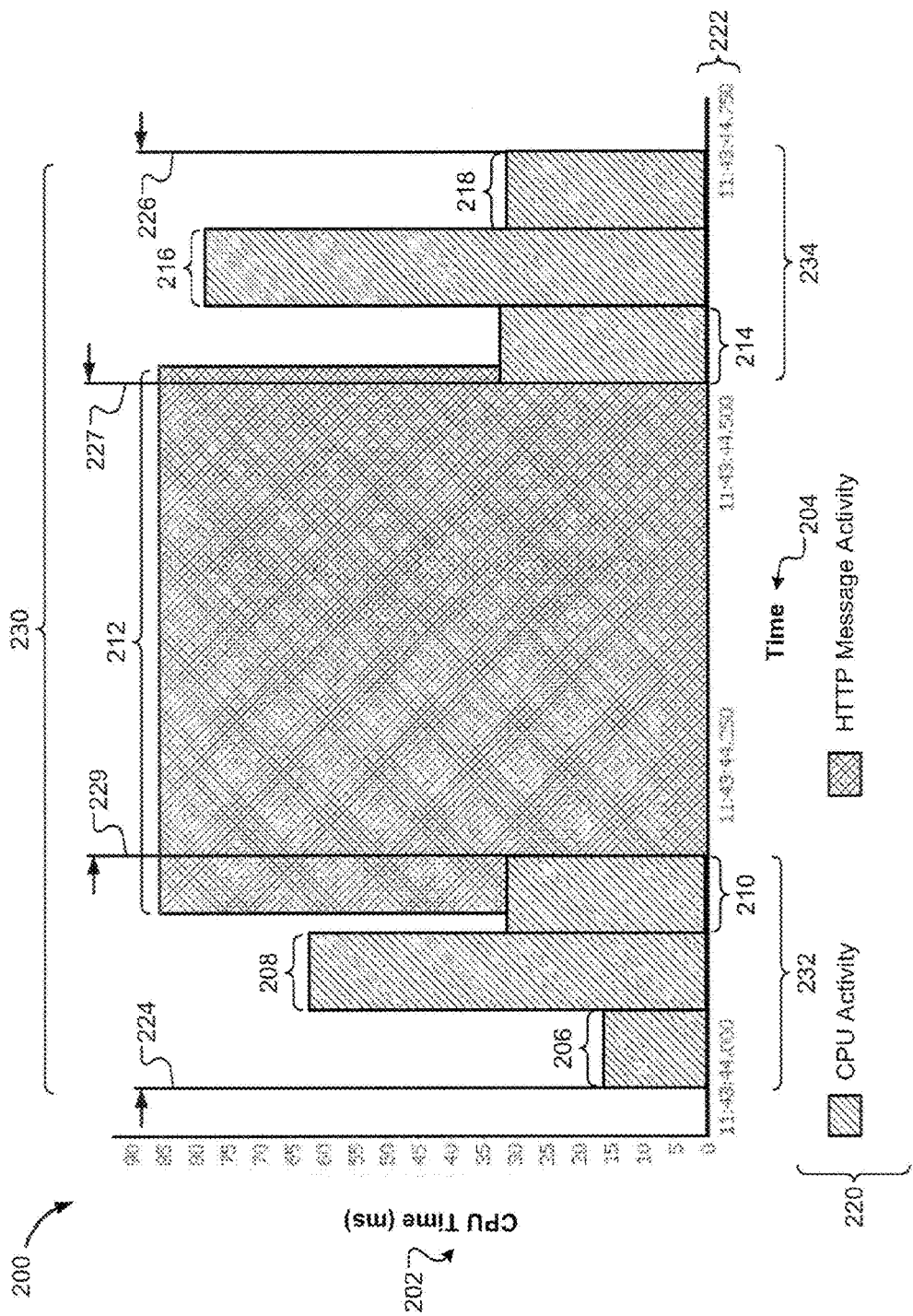
FIG. 4 is a zoomed-in graphical representation of a portion of processor and message activity on a web client.

Referring now to FIGS. 2-4, graphical representations of exemplar processor activity and user interactions are provided. FIG. 2 depicts a user interaction that instigate multiple message exchanges between a client and a server before a response is displayed to the user. FIG. 3 is a zoomed-in portion of the graphical representation of FIG. 2, and illustrates one user interaction that requires three message exchanges between the client and the server before a response is displayed to the user. FIG. 4 depicts a user interaction that instigates a message exchange between a client and a server before a response is displayed to the user.

With particular reference to FIG. 2, a graphical view 400 depicts a "CPU time differences in milliseconds" 302 versus "time" 304 for CPU activities and message activities. FIG. 3, discussed below, presents a more detailed view of these activities. FIG. 2 can present all data from a measurement performed on the message activity in block 312, block 314, and block 316, of FIG. 3. Both processor events and the lack of processor events are shown. The lack of processor events, as shown by empty space 402, can be used to pinpoint a measurement beginning or ending, for example.

The graphical views depicted in FIGS. 2-4 can, for example, be captured using a measurement application that analyzes processor activity and user interactions on a client device, or another device that is coupled for communication over the network 40. The measurement application can present graphical data (as shown in FIG. 2-4), text data, empirical data (e.g., predictions), or other tabulated data. In effect, the measurement application provides one or more representations of an end-to-end time pertaining to a particular user interaction that previously occurred in a web client device. In some implementations, the measurement is performed in realtime and the resulting data is analyzed. In other implementations, the measurement data can be collected and broadcast in realtime to a server, administrator, user, or other requesting entity. In yet other implementations, the measurement data may be stored, graphed, emailed, uploaded, printed, or otherwise captured.

Typically, processor time (and other resources) can be tracked by a web browser (e.g., web client) such as Internet Explorer, FireFox, Safari, and the like. Specifically, each browser includes a corresponding application programming interface (API) that provides communication information (e.g., message exchange information including timestamps of beginning and end). However, each browser API is generally incompatible with the other browser APIs, and cannot be used to monitor the communication of a single application. As such, the architecture 10 can employ the measurement application to perform processor monitoring and measurements, such as user interactions, independent of the particular web browser. For example, the client 20 may execute a particular web client from any number of available web clients and determine the duration of a user interaction independently of which web client the client 20 is running.

The measurement application may be implemented on the client 20, for example. The client 20 can begin providing measurements upon receiving a particular signal. For example, a user can begin by moving a cursor, sending a request, or other action. One measurement method may include the user selecting a start button to begin the measurement application, moving the mouse position, waiting a short time, clicking and maneuvering in the browser, and clicking a stop button on the measurement application after results are rendered. FIG. 2 provides an example where a user moved the mouse position (404), waited a short time period (402), and clicked on an application input area to provide data to a server (406). In this fashion, when the mouse moves, the processor performs, but when the mouse is still (e.g., when the user waits), the browser and processor does nothing user related. Providing a gap between the time period including moving the mouse (e.g., small activity) and the time period including sending messages to a server (e.g., large activity) can allow for a control point or mark point to begin baseline testing, for example.

With particular reference to FIG. 3, the view 300 includes one user interaction that requires three message exchanges between the client and the server. In particular, the user interaction results in separate messages (e.g., represented by blocks 312, 314, and 316) sent to and from a server system. As a result, the client system can determine a total end-to-end time 330 by capturing individual metrics for each separate message activity.

Each block 312, 314, and 316 illustrate different activity times. For example, the blocks 312 and 314 represent activities with substantially shorter durations than the activity represented by block 316. Each activity includes a respective start time and an end time, as described above. However, the user interaction time can be calculated based on the activities. Accordingly, a user interaction start time 332 and a user interaction end time 334 may be calculated. The start time 332 and end time 334 may be calculated in a similar fashion as described with reference to FIG. 4 below.

In some implementations, the user interaction metrics can be used to improve processing efficiency and/or performance speed of an application. For example, the metrics can be compared to system performance thresholds, browser performance thresholds, or other thresholds. In a specific example, the client 20 can use predetermined thresholds to determine whether the duration of a user interaction 312, 314, or 316 occurring on the client 20 exceeds a predetermined threshold duration. The predetermined threshold may include a particular maximum acceptable time for providing a response to a user interaction, for example. The maximum may pertain to a processing time such as 500 milliseconds, 1 second, or 4.3 seconds, for example.

The predetermined threshold can be used to optimize a user's interaction with one or more applications running on a server. For example, the architecture 10 can employ thresholds to ensure that the user interaction time for a particular user interaction with an application meets a specific threshold requirement. In particular, the client 20 can determine the duration of user interaction based on CPU time and messaging time and compare the duration to a predetermined threshold duration. The threshold duration may be implemented by an external server system, the client system, the application administrator, or other entity interested in providing optimization to the monitored application.

Each application can be analyzed for user interaction metrics. The metrics can be used to generate an alert when, for example, the duration of the user interaction exceeds the predetermined threshold duration. In a specific example, if the user interaction duration shown by end-to-end time 330 is longer than X seconds, an alert may be generated. For example, the end-to-end time of view 300 as 2.5 seconds. An alert can be generated to notify the system that a predetermined threshold of one second has been exceeded. Although environment 10 is used to monitor user interaction time in web based application software, other variables may also be monitored, including, but not limited to message responses, memory allocation and timing, or other processing times.

Referring now to FIG. 4, a graphical view 200 depicts processor activity and user interactions using a web client. In particular, the view 200 indicates relationships between central processing unit (CPU) activity and message communications between a client and a server. For example, the view 200 depicts "CPU time differences in milliseconds" 202 versus "time" 204 for CPU activities and message activities. The view 200 includes a measurement graph that depicts six blocks of processor activity including blocks 206, 208, 210, 214, 216, and 218. The blocks 206, 208, 210, 214, 216, and 218 represent browser activity (e.g., client CPU activity), as shown in legend 220. The block 212 represents message activity, hypertext transfer protocol (HTTP) in particular, as shown in legend 220. Because the implementations of the present disclosure are independent of the communication protocol, only timestamps of the begin and end of a message exchange need be measured. Consequently, the present disclosure can be implemented with other messaging protocols including, but not limited to, remote procedure calls (RPC). Block 212 shows one message sent from a client to a server. While only a single message interaction is depicted in FIG. 4, any number of message interactions can be captured, graphed, and analyzed using architecture 10, for example.

CPU activities may include, but are not limited to, those that result from mouse movement, keyboard strokes, switching application windows on a display, or other processor activity that does not include an interaction between a client and a server. Message activities (e.g., user interactions) may include any communications occurring between a client and a server, such as server requests (e.g., entering data into application fields to trigger response requests), service requests (e.g., launching an application to access services), network connection (e.g., requesting a Wi-Fi network, requesting a printer), requesting an inventory change, or any other activity involving the request of a server to perform a task. In some implementations, the message activities include combinations of HTTP messages and RCP message communications.

The view 200 depicts a timeline 222 representing a user interaction duration that extends from time 224 (e.g., start time 11:43:44.000) to time 226 (e.g., end time 11:43:44.750). The user interaction duration (time 224 to time 226) is an end-to-end time 230 for a particular user interaction. The end-to-end time 230 may be calculated as the difference between the start time of a user interaction and the end time of the same user interaction. The start time 224 signifies the beginning of processor activity on the client device corresponding to a particular user interaction. The end time 226 signifies the end of processor activity on the client device corresponding to the particular user interaction.

At some point during the detected CPU activity, message activity is detected in a message time period, as shown by block 212. For example, the client 20 can detect that a user entered a request that triggered a message to server 30. As is typical, initiating execution of a user interaction leads to some activity in the client device receiving user input. In some implementations, the client activity can be measured by sampling a consumed CPU time of a client process. The execution of the user interaction can trigger the sending of request messages to a server. For example, user input in client 20 can trigger a request message and send the request message to server 30. The message activity can continue for any amount of time. The message activities may include multiple request messages and corresponding responses to those messages.

Continuing with the above example, after the client 20 receives a final response message from the server 30, the client 20 is again actively displaying the response data (e.g., response rendering). In this example, the activity may be measured by sampling the consumed CPU time of the client process. In some implementations, an HTTP proxy server can be used if the communications between a particular client and server are performed using the HTTP protocol. Other protocols are possible.

Referring again to FIG. 4, a period of message activity 212, a first period of processor activity 232, and a second period of processor activity 234 are illustrated. The first period of processor activity 232 begins at a time 224 and ends at time 229. The time 229 overlaps the message time period 212. The second period of processor activity 234 begins at time 227 and ends at a time 226. The time 227 overlaps the message time period 212. The overlap between processor activity and message activity can be used to identify the relevant user interaction duration start and end times 224 and 226. For example, the start time 224 can be determined by identifying a time period of processor activity starting shortly before message time period 212. In particular, inspecting processor activity that ended at time 229 can be used to detect time 224 where the processor activity started. Consequently, the first period 232 can be identified as a period during which a user inputted data into the browser, for example.

In a similar fashion, the end time 226 can be determined by inspecting process activity shortly after time 227 and up to where the last processor action ends. Consequently, the second period 234 can be identified as a period during which the browser rendered a message responses from the server, for example. The user interaction duration time 230 can be determined based on the first start time 224 and the second end time 226 by inspecting activities just prior to an overlap in timing of processor activity and message activity. The duration time 230 represents the end-to-end time for a particular user interaction with an application.

In operation, the end-to-end time duration 230 can be captured using various techniques. In an example, the end-to-end time 230 can be captured using one client device such as client device 20. As described above, the end-to-end time 230 includes the time between the start time 224 and the end time 226. The start time 224 can be calculated using the timestamp of a sent message. For example, the client 20 can retrieve the time stamp of the beginning of the message activity 212. The client 20 can analyze the messaging and processor activity. The client 20 can determine the beginning of the processor activity (e.g., start time 224), and can place a start time marker. Similarly, the end time 226 can be determined by using the timestamp after the last response from the server 30 arrived. Specifically, the timestamp can be used to search for an activity occurring shortly after the message activity. The CPU activities in blocks 214, 216, and 218 occur shortly after the message activity. As such, the end of block 218 represents the end time 226.

In some implementations, the measurement application can monitor and analyze system processes using operating system APIs, for example. The measurement application can use the information to report specific CPU activity for each monitored process. In some implementations, measuring and analyzing all user interactions on a client device may not be desirable. For example, it may not be useful to measure or analyze a cursor movement that occurs as a direct effect of moving a mouse. As such, the architecture 100 can distinguish between simple cursor movements (e.g., or other uninvolved processing tasks) and more complex message activity.

Figure 5:
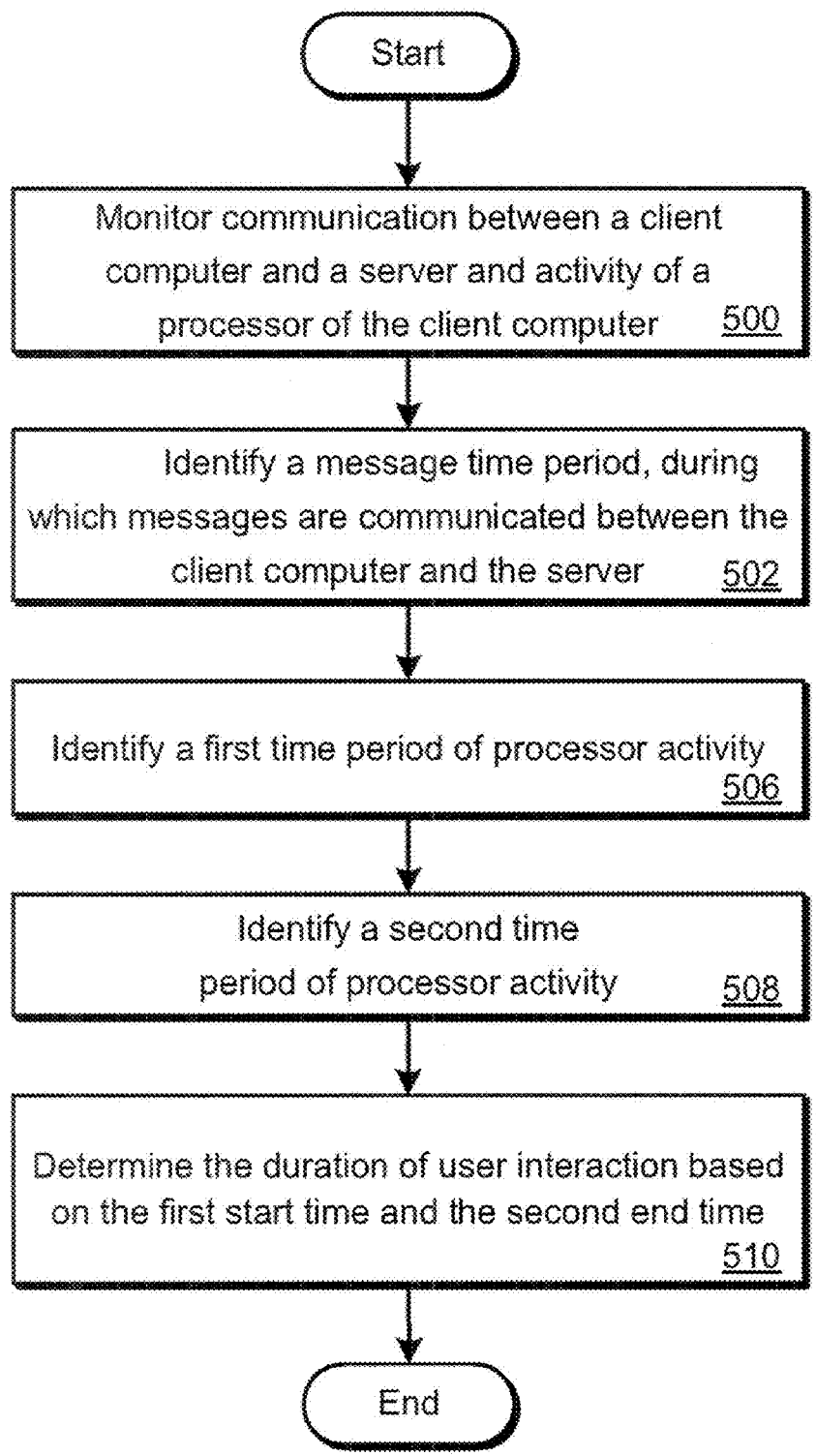
FIG. 5 is a flowchart illustrating exemplar steps that can be executed to determine a duration time of a user interaction.

FIG. 5 is a flowchart illustrating exemplar steps that can be executed in accordance with implementations of the present disclosure. In particular, the steps can be executed to determine a duration time of a user interaction. The process shown in FIG. 5 may be implemented using software instructions stored in a computer-readable storage medium and executed by a processing system including one or more processing apparatus.

In step 500, the process monitors communications between a client computer and a server, as well as the activity of a processor of the client computer. For example, the client 20 monitors communications between the client 20 and the server 30. The monitoring may include monitoring messages passed between the client 20 and the server 30, for example. The client 20 can monitor the activity of its own processor or another processor. The monitoring may include monitoring processing time, processor usage, memory usage, or another parameter.

In step 502, the process identifies a message time period, during which messages are communicated between the client computer and the server. For example, the client 20 identifies a message time period 212 (FIG. 4) in which messages are sent to the server 30 and received at the client 20. The determination can be performed by monitoring a number of timestamps associated with sent and received messages pertaining to an application. The client 20 identifies the message time period based on the timestamps. In step 506, the process identifies a first time period of processor activity. As shown in FIG. 4, the first time period may correspond to time period 232. The first time period 232 includes a first start time 224 and a first end time 229. The first end time 229 is within the message time period 212.

In step 508, the process identifies a second time period of processor activity. As shown in FIG. 4, the second time period may correspond to time period 234. The second time period 234 includes a second start time 227 and a second end time 226. The second start time 227 is within the message time period 212. In step 510, the process determines a duration of user interaction based on the first start time 224 and the second end time 226 (FIG. 4). For example, the client 20 can determine the duration of the entire user interaction by calculating the difference between the first start time 224 and the second end time 226.

Figure 6:
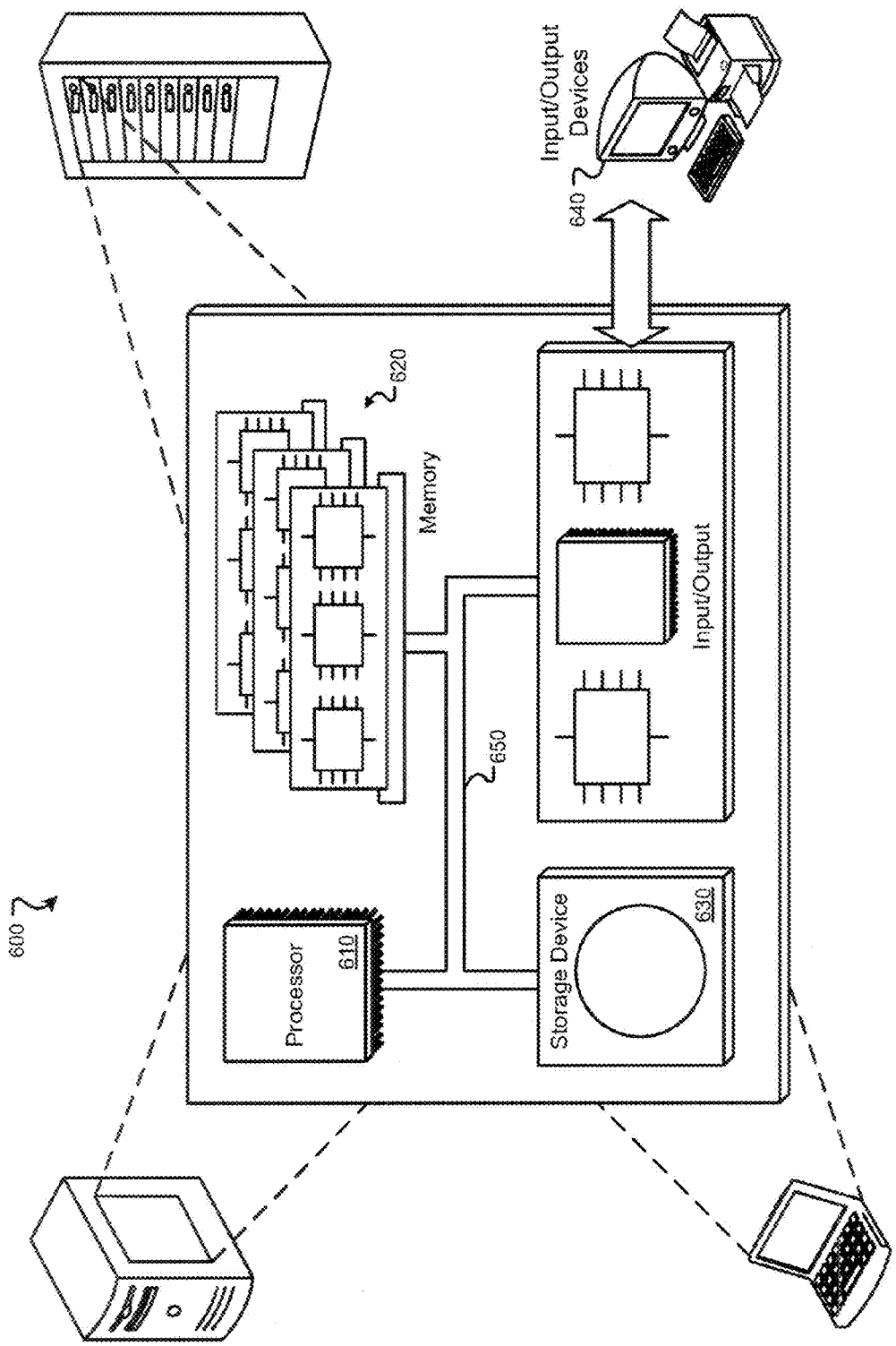
FIG. 6 is a schematic illustration of exemplar computer systems that can be used to execute implementations of the present disclosure.

Referring now to FIG. 6, a schematic diagram of an exemplar computer system 600 is provided. The system 600 can be used for the operations described in association with the method described in FIG. 5 according to one implementation. For example, the system 600 may be included in any or all of the server 30, and the clients 20 or 22. The system 600 includes a processor 610, a memory 620, a storage device 630, and an input/output device 640. Each of the components 610, 620, 630, and 640 are interconnected using a system bus 680. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device, or a flash memory device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for determining a duration of user interaction with a web-based application, the method comprising:
    monitoring communication between a client computer and a server that executes the web-based application;
    identifying a message time period, during which messages are communicated between the client computer and the server;
    monitoring activity of a processor of the client computer;
    determining that a first time period of processor activity overlaps the message time period, the first time period including a first start time and a first end time, the first start time being outside of the message time period and the first end time being within the message time period;
    determining that a second time period of processor activity overlaps the message time period, the second time period including a second start time and a second end time, the second start time being within the message time period, and the second end time being outside of the message time period;
    determining the duration of user interaction based on the first start time of the first time period of processor activity and the second end time of the second time period of processor activity;
    comparing the duration of user interaction to a predetermined threshold duration; and
    generating an alert when the duration of user interaction exceeds the predetermined threshold duration.

2. The computer-implemented method of claim 1, further comprising:
    monitoring a plurality of timestamps associated with the messages; and
    identifying the message time period based on the plurality of timestamps.

3. The computer-implemented method of claim 1, further comprising providing a proxy between the client computer and the server, the messages passing through the proxy.

4. The computer-implemented method of claim 1, wherein the messages comprise hypertext transfer protocol (HTTP) messages.

5. The computer-implemented method of claim 1, wherein the duration of user interaction is determined as a difference between the first start time and the second end time.

6. The computer-implemented method of claim 1, wherein the client computer executes a particular web client from a plurality of available web clients, and the duration is determined independently of the particular web client.

7. A non-transitory computer-readable storage medium coupled to one or more processors and having instructions stored thereon which, when executed by the one or more processors, cause the one or more processors to perform operations for determining a duration of user interaction with a web-based application, the operations comprising:
monitoring communication between a client computer and a server that executes the web-based application;
identifying a message time period, during which messages are communicated between the client computer and the server;
monitoring activity of a processor of the client computer;
determining that a first time period of processor activity overlaps the message time period, the first time period including a first start time and a first end time, the first start time being outside of the message time period and the first end time being within the message time period;
determining that a second time period of processor activity overlaps the message time period, the second time period including a second start time and a second end time, the second start time being within the message time period, and the second end time being outside of the message time period;
determining the duration of user interaction based on the first start time of the first time period of processor activity and the second end time of the second time period of processor activity;
comparing the duration of user interaction to a predetermined threshold duration; and
generating an alert when the duration of user interaction exceeds the predetermined threshold duration.

8. The computer-readable storage medium of claim 7, wherein the operations further comprise:
monitoring a plurality of timestamps associated with the messages; and
identifying the message time period based on the plurality of timestamps.

9. The computer-readable storage medium of claim 7, wherein the operations further comprise providing a proxy between the client computer and the server, the messages passing through the proxy.

10. The computer-readable storage medium of claim 7, wherein the messages comprise hypertext transfer protocol (HTTP) messages.

11. The computer-readable storage medium of claim 7, wherein the duration of user interaction is determined as a difference between the first start time and the second end time.

12. The computer-readable storage medium of claim 7, wherein the client computer executes a particular web client from a plurality of available web clients, and the duration is determined independently of the particular web client.

13. A system, comprising:
a client computer;
a server in communication with the client computer, the server executing a web-based application; and
one or more processors operable to execute instructions to perform operations for determining a duration of user interaction with the web-based application, the operations comprising:
monitoring communication between a client computer and the server;
identifying a message time period, during which messages are communicated between the client computer and the server;
monitoring activity of a processor of the client computer;
determining that a first time period of processor activity overlaps the message time period, the first time period including a first start time and a first end time, the first start time being outside of the message time period and the first end time being within the message time period;
determining that a second time period of processor activity overlaps the message time period, the second time period including a second start time and a second end time, the second start time being within the message time period, and the second end time being outside of the message time period;
determining the duration of user interaction based on the first start time of the first time period of processor activity and the second end time of the second time period of processor activity
comparing the duration of user interaction to a predetermined threshold duration; and
generating an alert when the duration of user interaction exceeds the predetermined threshold duration.

14. The system of claim 13, wherein the operations further comprise:
monitoring a plurality of timestamps associated with the messages; and
identifying the message time period based on the plurality of timestamps.

15. The system of claim 13, wherein the operations further comprise providing a proxy between the client computer and the server, the messages passing through the proxy.

16. The system of claim 13, wherein the messages comprise hypertext transfer protocol (HTTP) messages.

17. The system of claim 13, wherein the duration of user interaction is determined as a difference between the first start time and the second end time.

18. The system of claim 13, wherein the client computer executes a particular web client from a plurality of available web clients, and the duration is determined independently of the particular web client.

* * * * *